Oct. 31, 1967     OLE-BENDT RASMUSSEN     3,350,491
METHOD AND APPARATUS FOR STRETCHING PLASTIC FILM
Filed Aug. 3, 1964

INVENTOR.
OLE-BENDT RASMUSSEN
BY Young & Quigg
ATTORNEYS

United States Patent Office 3,350,491
Patented Oct. 31, 1967

3,350,491
METHOD AND APPARATUS FOR STRETCHING PLASTIC FILM
Ole-Bendt Rasmussen, Copenhagen, Denmark, assignor to Phillips Petroleum Company, a corporation of Delaware
Filed Aug. 3, 1964, Ser. No. 386,867
Claims priority, application Denmark, Aug. 8, 1963, 3,797
7 Claims. (Cl. 264—288)

This invention relates to a method of and apparatus for transversely stretching a film or band of a plastic material, in which the stretching takes place while the film or band is clamped between two belts of elastic material.

It is usual in film manufacture to produce thinner films from thicker ones by a stretching process, and a method often used is that of producing the film in tube form and stretching it by blowing air under pressure into the tube. This results in a stretching in the longitudinal as well as in the transverse direction.

For transverse stretching alone it has been proposed to use tenter clips which grip pairwise at the borders of the film and are pulled away from one another. In this way, however, at least the borders will be unevenly stretched, thus becoming uneven and having to be trimmed. Besides, the method is fairly complicated from a mechanical point of view, since the tenter clips have to be moved forward together with the film if a continuous process is desired.

I have previously developed a method for transversely stretching film in which the film is sandwiched between two rubber belts having border rims which are distended in a stretching zone by two diverging series of guide pulleys, the action of the belts upon the film ending where the distension is greatest.

Even in this method, problems concerning the apparatus are encountered, on the one hand because the special design of the rubber belts makes them costly and calls for special guiding measures, the life-time of the belts also being limited, and on the other hand because it is necessary to keep the belts pressed against one another by some means such as a pressurized fluid, preferably water.

These problems become particularly serious if the transverse stretching is not perpendicular to the longitudinal direction of the belts, since it will then be necessary, in one way or other, to compensate for the oblique tensile stresses.

It is the object of this invention to provide method and apparatus for performing transverse stretching continuously in such a manner that the tensile forces are evenly distributed over the surface of the film or band while it is being carried forward and are acting in the same direction at every single point of the film, this resulting in a uniform stretching over all of the film area.

Figure 1:
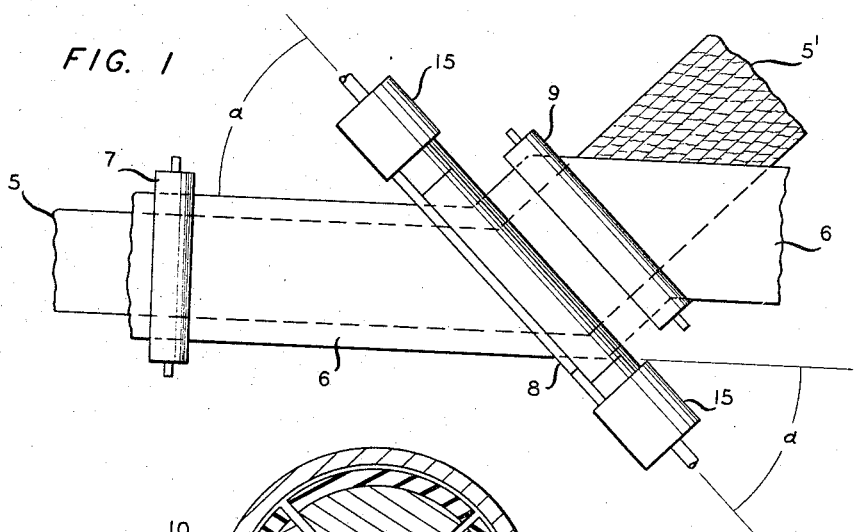
Figure 2:
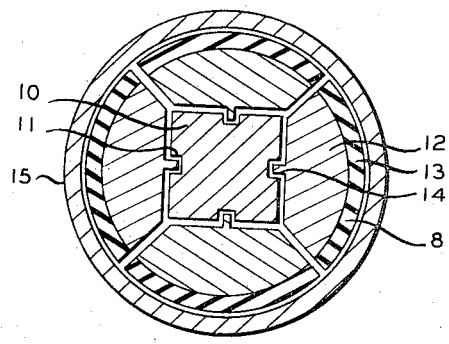
Figure 3:
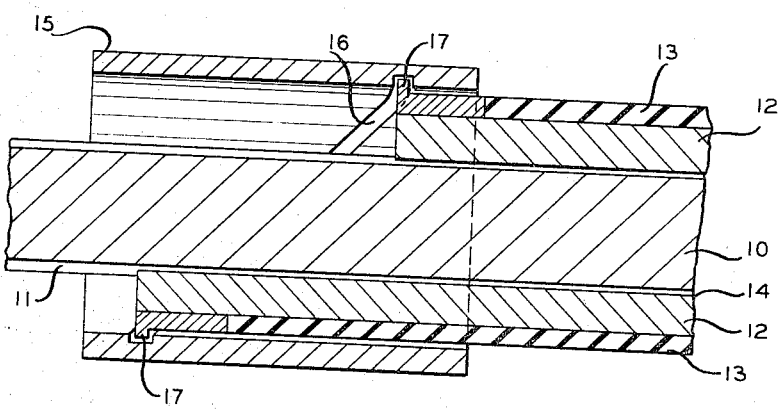

Other objects, advantages, and features of my invention will be apparent to those skilled in the art from the following description and drawing, in which FIGURE 1 shows a top view of a stretching apparatus for use in the present method;

FIGURE 2 shows a cross-section through a roller, forming part of the stretching apparatus, and FIGURE 3 shows a longitudinal section through part of this roller.

The present method remedies the said disadvantages of the known methods in a simple and unorthodox manner. In the said method, a sandwiching of the plastic material between two belts of elastic material is also applied, and the characteristic feature of the invention is that the elastic belts with the sandwitched material are introduced in the nip of two rollers, which are pressing against one another, at an angle α of less than 90° to the longitudinal axes of the rollers, and carried away by a pull over the whole width, at an angle to the said longitudinal axes which is greater than α, the resulting component of the pull in the direction of the longitudinal axes of the rollers being neutralized in that those parts of the roller surfaces which are in contact with the elastic belts perform a movement during the contact period in a direction opposite to that of the said pulling component.

If, for instance, the two rubber belts with the intervening sandwiched material, which is to be stretched, are led in between the pair of rollers at an angle of 45° to the longitudinal axes of the latter and pulled out perpendicularly by means of another set rollers, the rubber belts will undergo an increase of width in the said stretching zone to about 1.4 times the original width, and exert a corresponding pull on the sandwiched material. However, it would not be possible to perform such a guiding of the belts during the rotation of the rollers, unless certain measures were taken to counteract the wandering of the belts in the direction of the component parallel to the roller axis direction resulting from the oblique tensile forces and, accordingly, it is an important feature of the present method that the portions of the roller surfaces which are in contact with the rubber belts while the latter are changing their direction, perform a movement in a direction opposite to that of the said pulling component.

By varying the angles at which the belts enter and leave the nip of the rollers, it is possible to change the stretching direction which, however, will always form an angle different to 90° with the longitudinal direction of the material, said angle being about 45° in the above case.

The method of this invention can be applied to bands of tangled material as well as to films, but is developed, in particular, with a view to performing the stretching of a film of an orientable synthetic high-polymeric organic substance, such as polyethylene or polypropylene, or to the splitting into a network of fibers of a film of the said material, which has been oriented by stretching in the longitudinal direction, and in the following discussion the method will be described more specifically with reference to these uses.

This invention can be utilized for an asymmetrical splitting of a splittable film material into fibers by using as material for transverse stretching a film which has been strongly oriented by stretching in the longitudinal direction. By an asymmetrical splitting of this kind a fiber material of a special character is obtained, since it will consist of rather solid longitudinal stem fibers which are interconnected with very fine parallel branch fibers of a flat S-form. This material is particularly suited for yarn manufacture, the stem fibers giving strength, and the branch fibers giving great porosity.

The invention further comprises a roller for use in carrying out the present method. The characteristic feature of the said roller is that it is made up by at least two length sections which are displaceable in their longitudinal direction as shells on a revolving, but not longitudinally displaceable core, upon which they are mounted. The making of the roller in this manner results in an uncomplicated operation in that those portions of the roller surfaces which are in contact with the rubber belts can be moved in the desired direction for the compensation of the oblique tension in the said belts as long as the contact lasts, said portions returning when they are no longer in contact with the belts. Accordingly, the rollers can be mounted, and driven, just like common rollers.

The said longitudinal sections can, for instance, be in the form of cylinder segments which are movable on a core of polygonal cross-section, and the sections connected with the core by means of guide pins engaging longitudinal tracks in the core. On the guide pins, ball or roller bearings are mounted so as to provide for an easier displacement of the sections upon the core.

A simple and appropriate guiding of the movement of the longitudinal sections is obtained, according to the invention, by securing the said sections by means of enclosing stationary cylinders at both ends of the roller, and by providing at the inside of at least one of these cylinders a curve track in which guide pins on each of the sections engage, said track serving to move the displaceable sections longitudinally when the core is revolving. A variation of the speed of movement can be obtained either by exchanging the said cylinder or cylinders with others in which the curve track is otherwise disposed, or by arranging the pair of rollers so as to be driven at an adjustable speed. Generally, the latter possibility is the preferred one, since it gives the greater possibility of variation.

In the apparatus of FIGURE 1, a longitudinally oriented film 5 of a synthetic high-polymeric material is introduced between two parallel running, endless rubber belts 6 which are supported by rollers 7 which preferably do not keep the rubber belts pressed against one another. The belts 6, and the intervening film 5, are led in between a pair of rollers of a particular design and kept pressed against one another by said rollers, which will be described in detail in the following, and the introduction takes place at an angle of 45° to the longitudinal axis of the rollers 8. By means of a pair of rollers 9, the belts 6 are pulled out at right angles to the longitudinal axes of the rollers 8, by which the belts 6 and the intervening film 5 are subjected to a transverse stretching. After having passed the pair of rollers 9, the belts 6 are moved apart to release the intervening film 5'. The belts 6 are then guided back to their point of departure in the process, at the same time contracting to the original width.

In FIGURE 2, a cross-sectional view of one of the rollers 8 is shown. The said roller has a core 10 of square cross-section with longitudinal tracks 11 for guiding four cylinder sections 12, which are mutually independently movable longitudinally, and are provided with a rubber coating 13, the four sections forming together the surface of the roller. The sections 12 have guide pins or strips 14 engaging the longitudinal tracks 11, and balls or rollers, not shown, can be used for reducing the friction between the sections and the core, as well as between the guide pins and the tracks.

The core 10 does not necessarily have to be of square cross-section, but the cross-section can be of any other regular polygonal form. The core can also be cylindrical in cross-section. Neither are four cylinder sections needed, it being possible to use only two sections.

In the embodiment of the roller 8 shown in the drawing, the ends of said roller are encompassed by cylinders 15 which retain the sections 12 against the core. The said cylinders 15 are preferably stationary, but may be adapted for rotation at a rotational speed which is different from that of the rollers 8.

As shown on FIGURE 3, the inside of the cylinders 15 is provided with a curve track 16 serving to guide the longitudinal movement of the sections 12, the latter carrying rollers or pins 17 engaging the track 16.

The mode of action is as follows. By the said introduction of the rubber belts 6 with the intervening film 5 into the nip of a pair of rollers consisting of two of the rollers 8 at an angle of 45° to the longitudinal axis of the said rollers, and by the perpendicular pulling out by means of the rollers 9, a transverse stretching of the rubber belts 6, and thus of the intervening film 5, takes place. The latter being oriented in the longitudinal direction, and the stretching forces being uniformly distributed over the whole surface owing to the sandwiching between the rubber belts, either a transverse stretching or a splitting of the film will take place, depending on the degree of the longitudinal orienting. In the latter case, the splitting will be asymmetrical, since the transverse stretching is not perpendicular to the longitudinal orienting direction.

The asymmetrical splitting yields a product consisting of rather solid, longitudinally directed fibers, so-called stem fibers, and rather fine, so-called branch fibers running parallel in a flat S-form, and interconnecting the stem fibers.

Owing to the change of direction during the passage through the pair of rollers 8, the rubber belts 6 will have a tendency to migrate towards that end of the rollers, against which the change of direction occurs. This tendency has to be counteracted in order to carry through the present method, and this is the reason why the rollers 8 are made as described. By the relative revolving of the core 10 in relation to the cylinders, the sections 12 are forced into a longitudinal displacement by means of the rollers or pins 17 engaging the curve track 16. The latter has to be formed in such a manner that the sections 12 of the rollers 8, which at any given time form the nip through which the belts 6 pass, are longitudinally displaced while pressing against the belts, in a direction to counteract the said tendency of migration of the belts during the passage, and the pitch of the track 16 is so adjusted in relation to the relative speed of rotation that the said tendency is just neutralized. As soon as a section 12 is not any longer in contact with one of the belts 6, it is returned to the starting position, and then starts to move forward before it contacts the belt again.

It may be advantageous that the rubber belts 6 are slightly stretched longitudinally in the zone between the rollers 7 and the pair of rollers 8, by driving the latter at a little higher peripheral speed than that of the rollers 7, whereas the rollers 9 are driven at the same peripheral speed as that of the rollers 8. The belts 6 will then contract during their passage through the pair of rollers 8, causing a slight transverse pleating of the film 5 to take place, which is abolished by the splitting of the latter, but causes the tension of the individual fibers during the splitting, and also the risk of rupture of the fibers, to be reduced.

This invention can be applied to any orientable plastic material. Preferably the highly crystalline organic thermoplastics are used in the process, such as polyethylene, polypropylene, copolymers of ethylene or propylene with higher olefins, polyethylene terephthalate, nylon, and the like. Films of these materials can be longitudinally oriented by stretching them at temperatures below their crystalline melting points.

As will be apparent to those skilled in the art, various modifications can be made in this invention without departing from the spirit or scope thereof.

I claim:

1. A method of transversely stretching a film of orientable plastic material which comprises sandwiching said film between two belts of elastic material, passing said belts and film into the nip between two rollers pressed together, said belts and film entering between said rollers at an angle α less than 90° to the longitudinal axes of said rollers, removing said belts and film from between said rollers at an angle to said axes greater than α by pulling over the whole width of said belts, said pulling producing a resulting pulling component in the longitudinal direction of said rollers, and neutralizing said component by imparting in the opposite direction an axial movement to the parts of the roller surfaces touching said belts during the period of contact.

2. The method of claim 1 wherein said film has been previously strongly oriented by longitudinal stretching.

3. The method of claim 2 wherein said angle α is about 45° and said angle greater than α is 90°, said film being split into fibers by the transverse stretching.

4. The method of claim 2 wherein said belts are stretched longitudinally prior to entering between said rollers and said belts are permitted to contract during passage between said rollers.

5. A film stretching roller comprising a revolving core portion; a surface portion, said surface portion comprising at least two longitudinal sections, each section extending the full length of said surface portion and being longitudinally displaceable with respect to said core portion and mounted upon said core portion; and means for sequentially moving said sections in a back-and-forth motion along said core portion as said core portion rotates.

6. The roller according to claim 5 wherein said means for moving said sections comprises two stationary cylinders encircling and securing the displaceable sections at both ends of the roller, a curve track on the inside of at least one of the said cylinders, and guide pins mounted on each of the said sections and engaging said track, thus serving to impart a longitudinal movement to the movable sections when the core and surface sections are revolved.

7. Film stretching apparatus comprising, in combination, two continuous elastic belts rotatably mounted so that said belts are continuously brought together over a portion of their surfaces and then separated as said belts are rotated, means for feeding film between said belts, a pair of sectional rollers mounted together and between which said belts must pass, said rollers being disposed at an acute angle α to the direction of travel of said belts entering between said rollers, and means for withdrawing said belts from between said rollers at an angle to the axes thereof greater than said angle α, each of said sectional rollers having a rotatable core, longitudinally displaceable surface sections mounted on said core and means for displacing said surface sections along the axes of said rollers as said belts pass therebetween.

References Cited
UNITED STATES PATENTS

| | | |
|---|---|---|
| 2,305,470 | 12/1942 | Gibbs _____ 264—282 |
| 2,494,334 | 1/1950 | Dorst _____ 264—283 |
| 2,505,146 | 4/1950 | Ryan. |
| 3,019,475 | 2/1962 | Smith. |
| 3,235,644 | 2/1966 | Rasmussen _____ 264—288 |
| 3,296,351 | 1/1967 | Rasmussen _____ 264—289 |

FOREIGN PATENTS 46,301   12/1962   Poland.

ALEXANDER H. BRODMERKEL, *Primary Examiner.*

J. H. WOO, *Assistant Examiner.*